(12) United States Patent
Lim et al.

(10) Patent No.: US 10,901,527 B2
(45) Date of Patent: Jan. 26, 2021

(54) OPTICAL NAVIGATION SYSTEM AND NON-TRANSITORY COMPUTER READABLE MEDIUM CAN PERFORM OPTICAL NAVIGATION SYSTEM CONTROL METHOD

(71) Applicant: PixArt Imaging Inc., Hsin-Chu (TW)

(72) Inventors: Eugene Soon Tat Lim, Penang (MY); Keng Yeen Lye, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 51 days.

(21) Appl. No.: 16/141,945

(22) Filed: Sep. 25, 2018

(65) Prior Publication Data

US 2020/0097099 A1    Mar. 26, 2020

(51) Int. Cl.
| | |
|---|---|
| *G06F 3/0354* | (2013.01) |
| *G06F 3/03* | (2006.01) |
| *G06F 3/041* | (2006.01) |
| *G06F 3/042* | (2006.01) |
| *G06F 1/32* | (2019.01) |
| *G06F 3/02* | (2006.01) |
| *G06F 3/038* | (2013.01) |

(52) U.S. Cl.
CPC ............. *G06F 3/0304* (2013.01); *G06F 1/32* (2013.01); *G06F 3/02* (2013.01); *G06F 3/038* (2013.01); *G06F 3/03543* (2013.01); *G06F 3/042* (2013.01); *G06F 3/0416* (2013.01)

(58) Field of Classification Search
CPC ........................... G06F 1/3215; G06F 3/03543
USPC ........................................................... 345/166
See application file for complete search history.

(56) References Cited

U.S. PATENT DOCUMENTS

| | | | |
|---|---|---|---|
| 2006/0132443 A1* | 6/2006 | Chien Wu ............. | G06F 1/3215 345/166 |
| 2007/0024587 A1* | 2/2007 | Shiau ..................... | G06F 1/3215 345/166 |
| 2015/0009147 A1* | 1/2015 | Chen .................... | G06F 3/03543 345/166 |

* cited by examiner

*Primary Examiner* — Abdul-Samad A Adediran
(74) *Attorney, Agent, or Firm* — Winston Hsu

(57) ABSTRACT

Disclosed is an optical navigation system, which comprises: a main control circuit; an activating device, coupled to the main control circuit; and an optical sensor, coupled to the main control circuit and the activating device. The main control circuit controls the activating device to transit from a first standby mode to a first active mode when the optical sensor enters a second standby mode. The activating device generates an activating command to transit the optical sensor from the second standby mode to a second activate mode corresponding to a specific action, when the activating device is in the first active mode. By this way, the optical sensor can be activated via another device rather than the optical data sensed by itself, thus the power consumption can be reduced.

22 Claims, 5 Drawing Sheets

OPTICAL NAVIGATION SYSTEM AND NON-TRANSITORY COMPUTER READABLE MEDIUM CAN PERFORM OPTICAL NAVIGATION SYSTEM CONTROL METHOD

BACKGROUND OF THE INVENTION

1. Field of the Invention

The present invention relates to an optical navigation system and a non-transitory computer readable recording medium can perform an optical navigation system control method, and particularly relates to an optical navigation system and a non-transitory computer readable recording medium which can save power consumption via activating an optical sensor using an activating device independent from the optical sensor.

2. Description of the Prior Art

An optical navigation system always comprises an optical sensor to capture optical data such as light or an image, thereby the optical navigation system can determine a location of an object or a location thereof according to the optical data.

The optical sensor may enter a ready mode when the optical navigation system is not in an active mode. In the ready mode, the optical sensor may apply a lower frame rate or a lower resolution to sense optical data, and backs to an active mode when characteristics of the optical data changes.

However, still a lot of power is required for the ready mode of the optical sensor, since the optical sensor needs sufficient power to operate well.

SUMMARY OF THE INVENTION

One objective of the present invention is to provide an optical navigation system which can activate the optical sensor by an activating device independent from the optical sensor.

Another objective of the present invention is to provide a non-transitory computer readable recording medium can perform an optical navigation system control method which can activate the optical sensor by an activating device independent from the optical sensor.

One embodiment of the present invention provides an optical navigation system, which comprises: a main control circuit; an activating device, coupled to the main control circuit; and an optical sensor, coupled to the main control circuit and the activating device. The main control circuit controls the activating device to transit from a first standby mode to a first active mode when the optical sensor enters a second standby mode. The activating device generates an activating command to transit the optical sensor from the second standby mode to a second activate mode corresponding to a specific action, when the activating device is in the first active mode.

Another embodiment of the present invention provides a non-transitory computer readable recording medium comprising at least one program, an optical navigation system control method is performed when the program is executed. The optical navigation system control method comprising: controlling an activating device of an optical navigation system to transit from a first standby mode to a first active mode when an optical sensor of the optical navigation system enters a second standby mode via a main control circuit of the optical navigation system; and generating an activating command via the activating device, to transit the optical sensor from the second standby mode to a second activate mode corresponding to a specific action, when the activating device is in the first active mode.

In view of above-mentioned embodiments, the power consumption of the optical navigation system can be saved when the optical sensor is in a standby mode thereof.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or a hardware with software (e.g. a program installed to a processor). Besides, the method in following descriptions can be executed by programs stored in a non-transitory computer readable recording medium such as a hard disk, an optical disc or a memory. Besides, the term "first", "second", "third" in following descriptions are only for the purpose of distinguishing different one elements, and do not mean the sequence of the elements. For example, a first device and a second device only mean these devices can have the same structure but are different devices.

Figure 1:
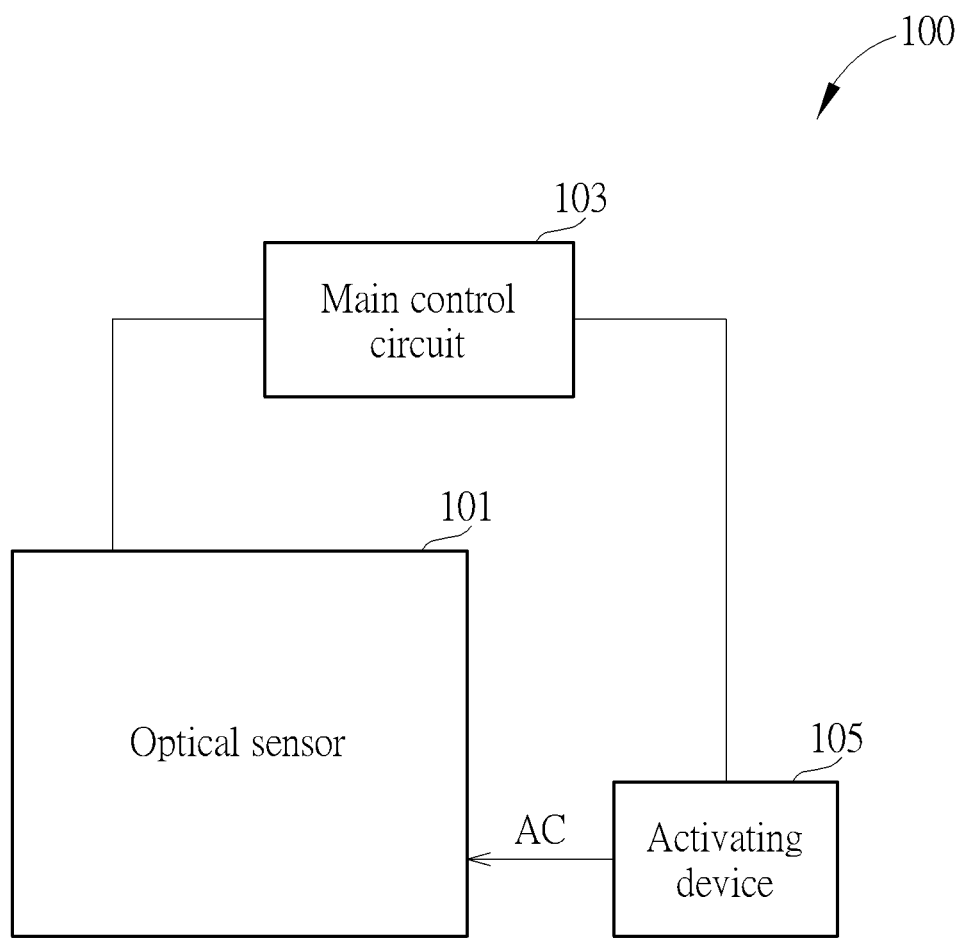
FIG. 1 is a block diagram illustrating an optical navigation system according to one embodiment of the present invention.

FIG. 1 is a block diagram illustrating an optical navigation system according to one embodiment of the present invention. As illustrated in FIG. 1, the optical navigation system 100 comprises an optical sensor 101, a main control circuit 103 and an activating device 105. The main control circuit 103 controls the activating device 105 to transit from a first standby mode to a first active mode when the optical sensor 101 enters a second standby mode. Additionally, the activating device 105 generates an activating command AC to transit the optical sensor 101 from the second standby mode to a second activate mode corresponding to a specific action, when the activating device 105 is in the first active mode. The specific action can be but not limited to a user's action, such as touch the optical navigation device or move the optical navigation device.

Briefly, if one of the optical sensor 101 and the activating device 105 enters a corresponding standby mode, the other one will change to a corresponding active mode. On the contrary, if one of the optical sensor 101 and the activating device 105 enters a corresponding active mode, the other one will change to a corresponding standby mode. Therefore, in embodiment, the main control circuit 103 controls the activating device 105 to transit from the first active mode to the first standby mode after the optical sensor 101 transits from the second standby mode to the second active mode according to the activating command AC. Based on such embodiment, since the optical sensor 101 is activated by the activating device 105 rather than depending on the optical data sensed by the optical sensor 101. The optical sensor 101 does not need power to sense optical data in the second standby mode, thus the power consumption for the optical sensor 101 in the second standby mode is lower than the power consumption for the conventional optical sensor in the ready mode. In one embodiment, the main control circuit 103 enters a third standby mode after the activating device 105 transits from the first standby mode to the first active mode, thereby the power consumption of the optical navigation system 100 can be further decreased.

The optical sensor 101 may be, for example, a light sensor or an image sensor. The main control circuit 103 can be a processor installed with at least one needed program. In one embodiment, the main control circuit 103 is also applied to control other operations of the optical navigation system 100. For example, the main control circuit 103 can be applied to calculate a location of an object (e.g. a finger) touching the optical navigation system 100 according to the optical data sensed by the optical sensor 101 in the second active mode, or be applied to calculate a location of the optical navigation system 100 according to the optical data sensed by the optical sensor 101 in the second active mode.

Also, the activating device 105 can be various kinds of devices independent from the optical sensor 101. Details of the activating device 105 will be described later. In one embodiment, the activating device 105 is coupled to the optical sensor 101 via an I/O interface such as a GPIO (General Purpose Input/Output), which is not illustrated here. Besides, in one embodiment, the activating command AC is an interrupt.

Please note the above-mentioned active mode/the standby mode of the activating device 105, and the active mode/the standby mode of the optical sensor 101 have different names for the convenience of distinguishing. More specifically, the active mode/the standby mode of the activating device 105 are respectively named first active mode and first standby mode, and the active mode/the standby mode of the optical sensor 101 are respectively named second active mode and second standby mode.

The first standby mode and the second standby mode may have different definitions. For example, for the optical sensor 101, the power consumption of the second standby mode must be lower than the second active mode, thus the frame rate or the resolution applied in the second standby mode is lower than the frame rate or the resolution applied in the second active mode. For the activating device 105, the power consumption of the first standby mode must be lower than which of the first active mode, but the parameters applied in the first standby mode and the second active mode can be changed corresponding to different kinds of activating devices. For example, if the activating device is a touch sensing device, the sampling rate of the activating device in the first standby mode is lower than the sampling rate in the first active mode. Following the same rule, the active mode and the standby mode of the main control circuit 103 are respectively named a third active mode and a third standby mode.

As above-mentioned, the activating device 105 can be various kinds of devices independent from the optical sensor 101. In one embodiment, the activating device 105 is a touch sensing device, and the above-mentioned specific action is a touch event detected by the activating device 105. For more detail, if the optical sensor 101 is in the second standby mode, and the activating device 105 senses a touch event in the first active mode. The activating device 105 will send an activating command AC to transit the optical sensor 101 from the second standby mode to the second active mode, since the touch event may mean a user will uses the optical navigation system 100.

Following the same rule, in one embodiment, the activating device 105 is a movement detecting device such as an accelerometer or a gyro, and the above-mentioned specific action is a movement detected by the activating device 105. Additionally, in another embodiment, the activating device 105 is a proximity sensor, and the above-mentioned specific action is a proximity event detected by the activating device 105.

In still another embodiment, the activating device 105 comprises a mechanical switch (e.g. a button) disposed on a surface of the optical navigation system, and the above-mentioned specific action is a trigger detected by the activating device 105. By this way, the optical sensor 101 can be triggered by the mechanical switch without using any other component. The mechanical switch can further comprise a circuit or a device which can be controlled by the main control circuit 103 to enter the first active mode or the first standby mode. Also, such circuit or a device of the mechanical switch can send the activating command AC to the optical sensor 101.

For the convenience of understanding, a flowchart explaining the operations for the optical navigation system 100 illustrated in FIG. 1 is provided in following descriptions. It will be appreciated that these flow charts are only examples for explaining and do not mean to limit the scope of the present invention.

Figure 2:
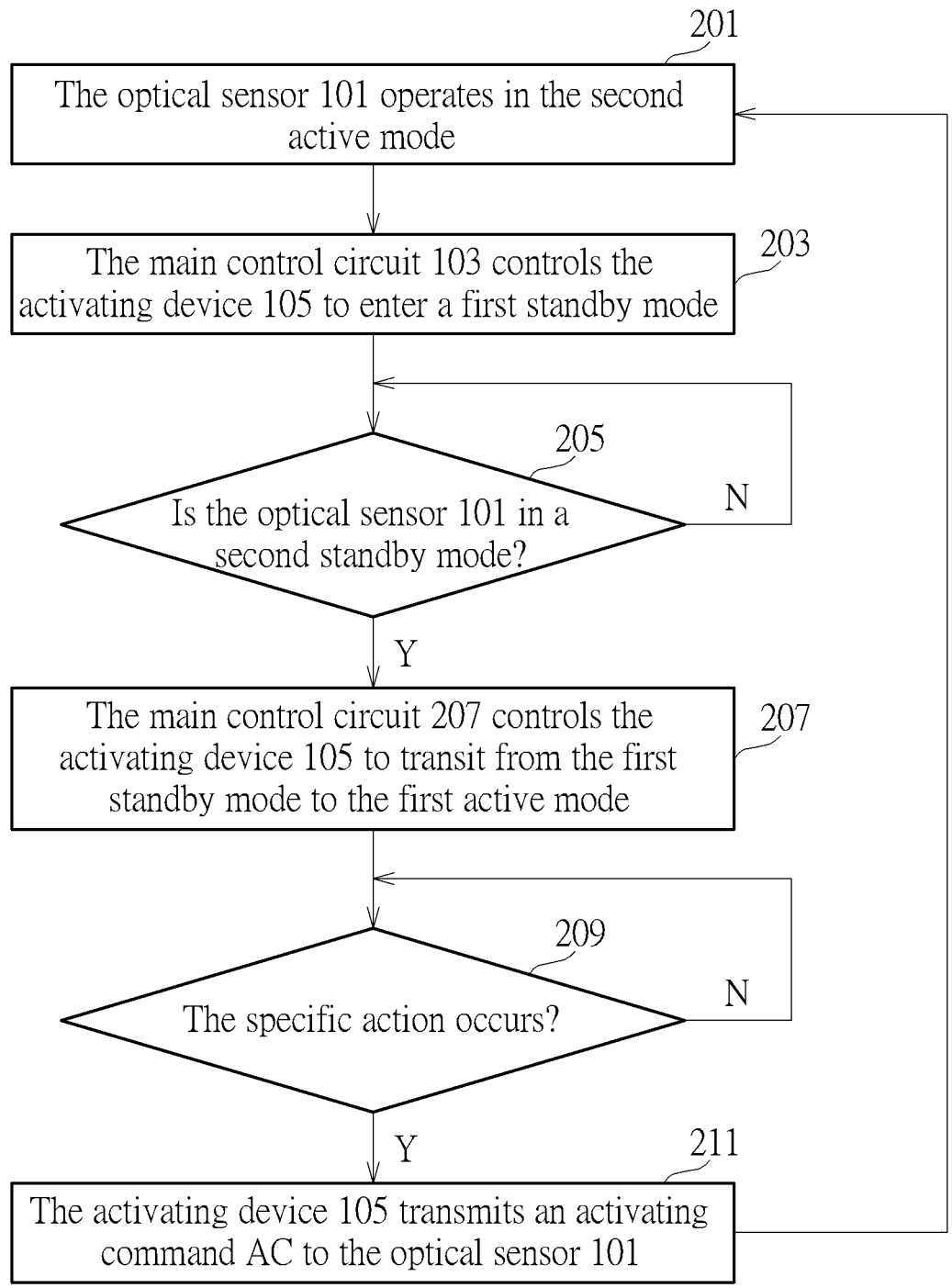
FIG. 2 is a flow chart illustrating an optical navigation system control method according to one embodiment of the present invention.

FIG. 2 is a flow chart illustrating an optical navigation system control method according to one embodiment of the present invention, which comprises the steps of:

Step 201

The optical sensor 101 operates in the second active mode.

Step 203

The main control circuit 103 controls the activating device 105 to enter a first standby mode.

Step 205

The main control circuit 103 determines whether the optical sensor 101 is in a second standby mode or not. If not, repeatedly perform the step 205, if yes, go to step 207.

Step 207

The main control circuit 207 controls the activating device 105 to transit from the first standby mode to the first active mode.

Step 209

The main control circuit 103 determines if the specific action occurs. If not, repeatedly perform the step 209, if yes, go to step 211.

Step 211

The activating device 105 transmits an activating command AC to the optical sensor 101.

Figure 3:
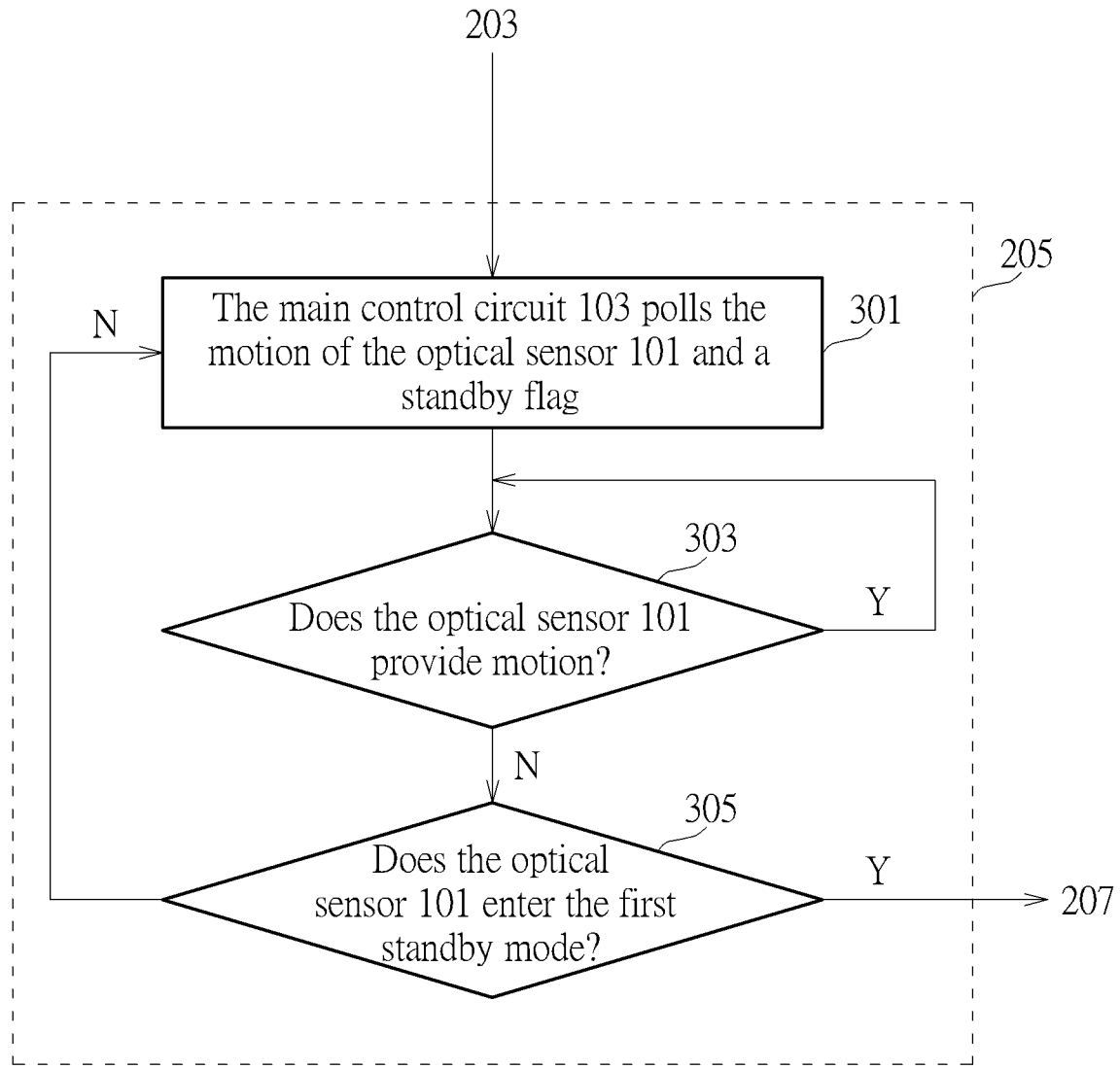
FIG. 3 is a flow chart illustrating detail steps for the step 205 illustrated in FIG. 2, according to one embodiment of the present invention.

FIG. 3 is a flow chart illustrating details steps for the step 205 illustrated in FIG. 2, according to one embodiment of the present invention. The flow chart in FIG. 3 comprises following steps:

Step 301

The main control circuit 103 polls the motion of the optical sensor 101 and a standby flag.

Step 303

The main control circuit 103 determines if the optical sensor 101 provides motion. For example, the main control circuit 103 determines if the optical sensor 101 generates any optical data. If yes, it means the optical sensor is still in the second active mode, thus the step 303 is repeatedly performed.

Step 305

The main control circuit 103 determines whether the optical sensor 101 enters the first standby mode or not. If yes, go to step 207, if not, go back to the step 301.

The optical sensor 101 may still stay in the second activate mode and is just in a latency period when the optical sensor 101 has no motions. In one embodiment, if the optical sensor 101 enters the first standby mode, the optical sensor 101 generates a standby flag or sets the standby flag to a specific value (e.g. 1 or 0), such that the main control circuit 103 can determine whether the optical sensor 101 enters the first standby mode or not based on the standby flag.

Figure 4:
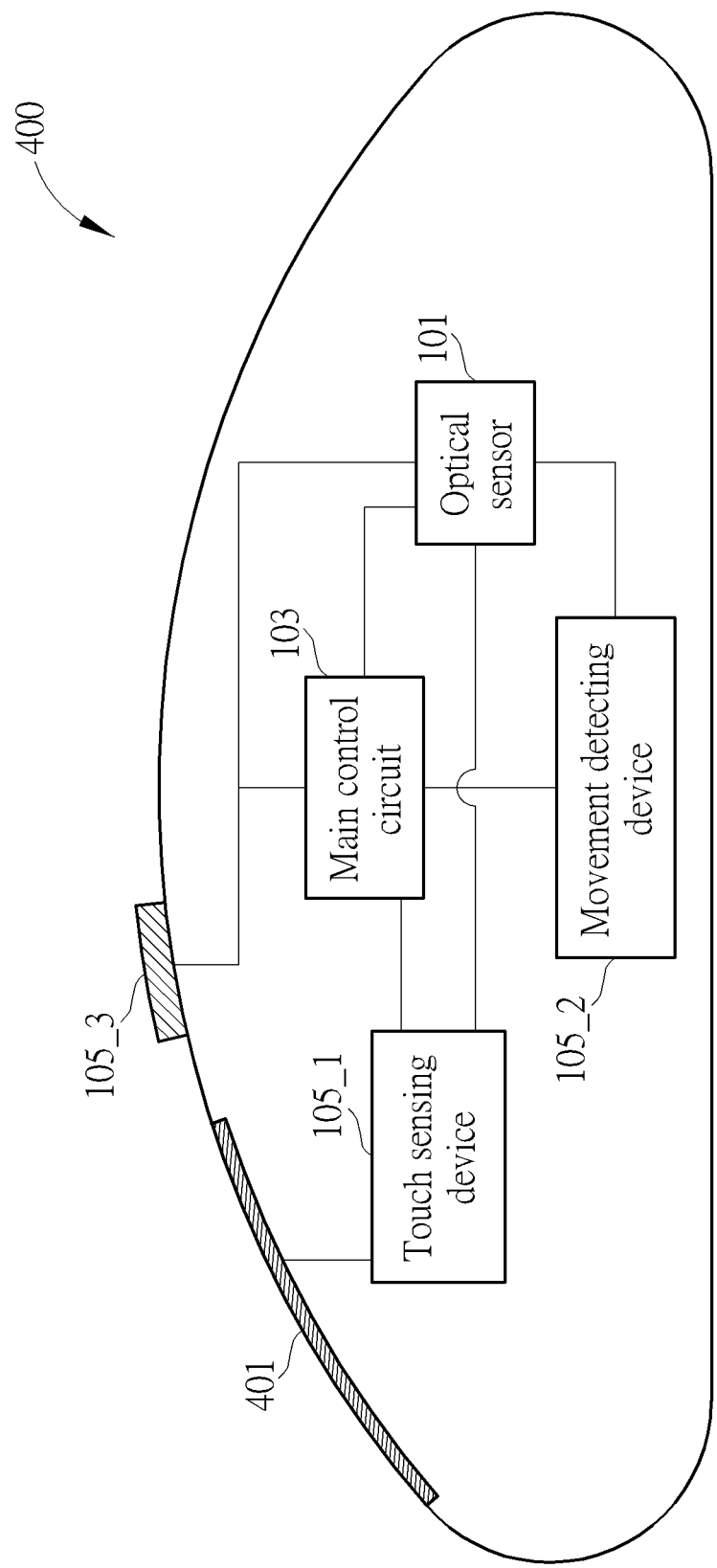
FIG. 4 and FIG. 5 are block diagrams illustrating optical navigation systems according to different embodiments of the present invention.
Figure 5:
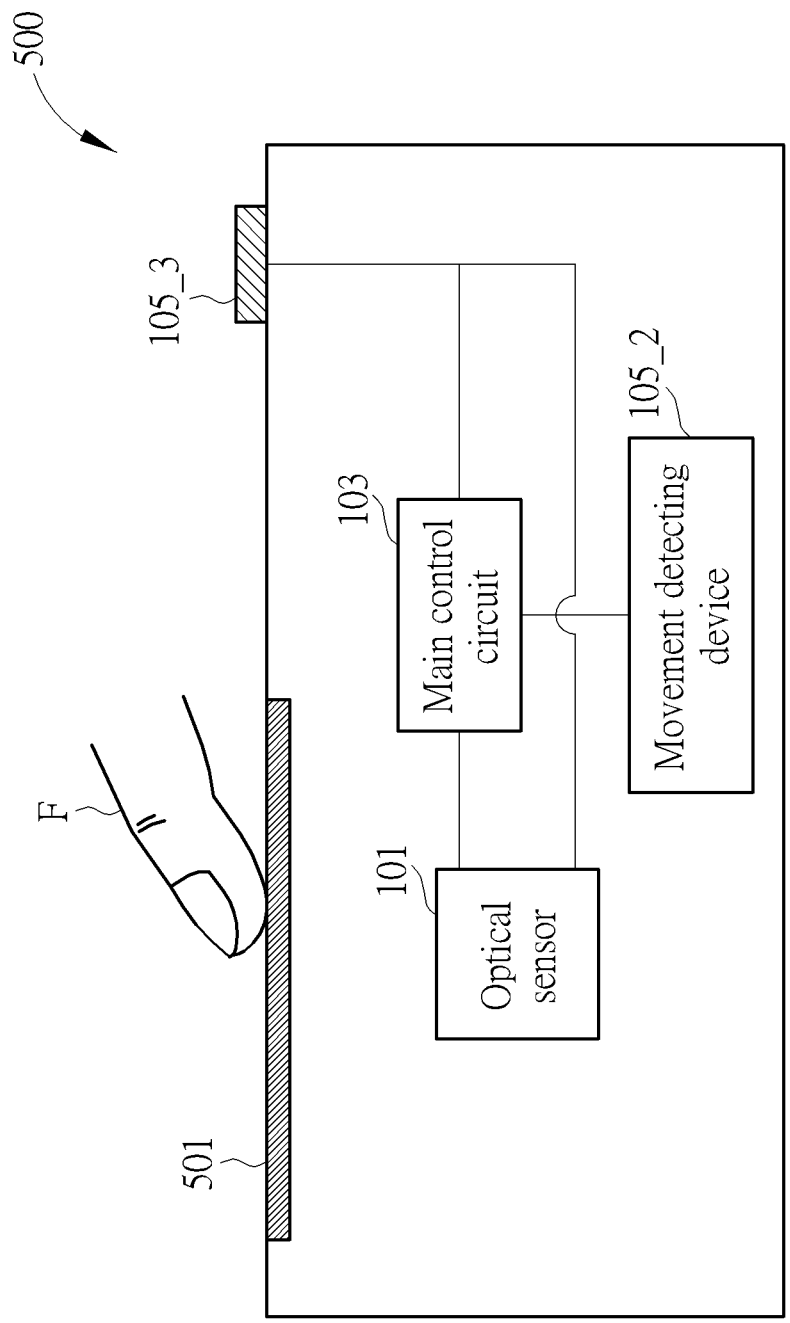

In view of the flow charts illustrated in FIG. 2 and FIG. 3, an optical navigation system control method can be acquired, which can comprise following steps: controlling an activating device 105 of an optical navigation system 100 to transit from a first standby mode to a first active mode when an optical sensor 101 of the optical navigation system 100 enters a second standby mode via a main control circuit 103 of the optical navigation system 100; and generating an activating command AC via the activating device 105, to transit the optical sensor 101 from the second standby mode to a second activate mode corresponding to a specific action, when the activating device 105 is in the first active mode FIG. 4 and FIG. 5 are block diagrams illustrating optical navigation systems according to different embodiments of the present invention, in views different from the view of FIG. 1. Please note the optical navigation system 100 illustrated in FIG. 1 can have other structures besides the structures illustrated in FIG. 4 and FIG. 5.

In the embodiment of FIG. 4, the optical navigation system is an optical mouse 400. The optical mouse 400 comprises the optical sensor 101 and the main control circuit 103 illustrated in FIG. 1. The main control circuit 103 can calculate a location of the optical mouse 400 based on the optical data sensed by the optical sensor 101. In such case, the optical data can mean an image generated by reflected light from a surface on which the optical mouse 400 is provided.

Besides, the optical mouse 400 comprises a touch sensing device 105_1, a movement detecting device 105_2, or a mechanical switch 105_3, which can respectively serve as the activating device 105. Based upon above-mentioned descriptions, when the optical sensor 101 is in the second standby mode, the touch sensing device 105_1 can generate an activating command AC to transit the optical sensor 101 to the second active mode when a touch event occurs on the touch sensing surface 401 (e.g. a finger touches the touch sensing surface 401). Also, the movement detecting device 105_2 can generate an activating command AC to transit the optical sensor 101 to the second active mode when the optical mouse 400 is moved. Additionally, the mechanical switch 105_3 can generate an activating command AC to transit the optical sensor 101 to the second active mode when the mechanical switch 105_3 is triggered (e.g. touched or pressed).

In the embodiment of FIG. 5, the optical navigation system is a optical pointing device 500. The optical pointing device 500 comprises the optical sensor 101 and the main control circuit 103 illustrated in FIG. 1. The main control circuit 103 can calculate a location of an object (a finger F in this example) on the touch surface 501 based on the optical data sensed by the optical sensor 101. Also, optical pointing device 500 can serve as a remote controller while a user holds the optical pointing device 500 and waves it.

Besides, the optical pointing device 500 comprises the movement detecting device 105_2 or the mechanical switch 105_3, which can respectively serve as the activating device 105. Based upon above-mentioned descriptions, when the optical sensor 101 is in the second standby mode, the movement detecting device 105_2 can generate an activating command AC to transit the optical sensor 101 to the second active mode when the optical pointing device 500 is moved. Additionally, the mechanical switch 105_3 can generate an activating command AC to transit the optical sensor 101 to the second active mode when the mechanical switch 105_3 is triggered (e.g. touched or pressed).

In view of above-mentioned embodiments, the power consumption of the optical navigation system can be saved when the optical sensor is in a standby mode thereof. However, please note the concept disclosed by the present invention is not limited to solve such problem.

Those skilled in the art will readily observe that numerous modifications and alterations of the device and method may be made when retaining the teachings of the invention. Accordingly, the above disclosure should be construed as limited only by the metes and bounds of the appended claims.

What is claimed is:

1. An optical navigation system, comprising:
   a main control circuit;
   an activating device, which is independent from the optical sensor and is coupled to the main control circuit; and
   an optical sensor, which is configured to sense optical data and is coupled to the main control circuit and the activating device;
   wherein the main control circuit controls the activating device to transit from a first standby mode to a first active mode when the optical sensor enters a second standby mode;
   wherein the activating device generates an activating command to transit the optical sensor from the second standby mode to a second active mode corresponding to a specific action, when the activating device is in the first active mode;
   wherein the main control circuit controls the activating device to transit from the first active mode to the first standby mode after the optical sensor transits from the second standby mode to the second active mode according to the activating command;
   wherein power consumption of the optical sensor in the second standby mode is lower than power consumption of the optical sensor in the second active mode, and power consumption of the activating device in the first standby mode is lower than power consumption of the activating in the first active mode.

2. The optical navigation system of claim 1, wherein the main control circuit enters a third standby mode after the activating device transits from the first standby mode to the first active mode.

3. The optical navigation system of claim 1, further comprising a touch sensing device served as the activating device.

4. The optical navigation system of claim 3, wherein the specific action is a touch event detected by the activating device.

5. The optical navigation system of claim 1, further comprising a movement detecting device served as the activating device.

6. The optical navigation system of claim 5, wherein the specific action is a movement of the optical navigation system detected by the activating device.

7. The optical navigation system of claim 1, wherein the activating device comprising a mechanical switch disposed on a surface of the optical navigation system.

8. The optical navigation system of claim 7, wherein the specific action is a trigger for the mechanical switch.

9. The optical navigation system of claim 1, further comprising a proximity sensor served as the activating device.

10. The optical navigation system of claim 9, wherein the specific action is a proximity event detected by the activating device.

11. The optical navigation system of claim 1, wherein the optical sensor senses the optical data in the second active mode but does not sense the optical data in the second standby mode.

12. A non-transitory computer readable recording medium, comprising at least one program, an optical navigation system control method is performed when the program is executed, the optical navigation system control method comprising:
   controlling an activating device of an optical navigation system to transit from a first standby mode to a first active mode when an optical sensor of the optical navigation system enters a second standby mode via a main control circuit of the optical navigation system, wherein the optical sensor is configured to sence optical data and the activating device is independent from the optical sensor;
   generating an activating command via the activating device, to transit the optical sensor from the second standby mode to a second active mode corresponding to a specific action, when the activating device is in the first active mode; and
   controlling the activating device to transit from the first active mode to the first standby mode after the optical sensor transits from the second standby mode to the second active mode according to the activating command;
   wherein power consumption of the optical sensor in the second standby mode is lower than power consumption of the optical sensor in the second active mode, and power consumption of the activating device in the first standby mode is lower than power consumption of the activating in the first active mode.

13. The non-transitory computer readable recording medium of claim 12, wherein the optical navigation system control method further comprises:
   controlling the main control circuit to enter a third standby mode after the activating device transits from the first standby mode to the first active mode.

14. The non-transitory computer readable recording medium of claim 12, wherein the optical navigation system further comprises a touch sensing device served as the activating device.

15. The non-transitory computer readable recording medium of claim 14, wherein the specific action is a touch event detected by the activating device.

16. The non-transitory computer readable recording medium of claim 12, wherein the optical navigation system further comprises a movement detecting device served as the activating device.

17. The non-transitory computer readable recording medium of claim 16, wherein the specific action is a movement of the optical navigation system detected by the activating device.

18. The non-transitory computer readable recording medium of claim 12, wherein the activating device comprising a mechanical switch disposed on a surface of the optical navigation system.

19. The non-transitory computer readable recording medium of claim 18, wherein the specific action is a trigger for the mechanical switch.

20. The non-transitory computer readable recording medium of claim 12, wherein the optical navigation system further comprises a proximity sensor served as the activating device.

21. The non-transitory computer readable recording medium of claim 20, wherein the specific action is a proximity event detected by the activating device.

22. The non-transitory computer readable recording medium of claim 12, wherein the optical sensor senses the optical data in the second active mode but does not sense the optical data in the second standby mode.

* * * * *